T. B. DRESCHER.
MANUFACTURE OF LENSES.
APPLICATION FILED DEC. 4, 1919.

1,350,441.

Patented Aug. 24, 1920.

INVENTOR.
Theodore B. Drescher
BY
his ATTORNEY

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

MANUFACTURE OF LENSES.

1,350,441.   Specification of Letters Patent.   Patented Aug. 24, 1920.

Application filed December 4, 1919. Serial No. 342,334.

*To all whom it may concern:*

Be it known that I, THEODORE B. DRESCHER, a citizen of the United States, and resident of Rochester, in the county of Monroe and State of New York, have invented certain new and useful Improvements in Manufacture of Lenses; and I do hereby declare the following to be a full, clear, and exact description of the same, reference being had to the accompanying drawings, forming a part of this specification, and to the reference-numerals marked thereon.

My present invention has for its object to improve the manufacture of fused lenses embodying two parts having complementarily formed surfaces and particularly adapted for the manufacture of bifocal lenses of the class embodying a main body of glass of one refractive index which when ground constitutes the lens for distance vision, known generally as the major lens, and a minor lens for near vision formed of glass of a higher or different refractive index arranged in a recess adapted for its reception in the major lens and secured therein by fusion of said glass.

In making bifocal lens blanks of this type it has been customary to first form in the major lens blank a recess or cavity of the proper curvature and then secure the minor lens blank which has been previously ground on its under side, by supporting it at one edge of the recess in the major lens blank in direct contact therewith and supporting the opposite edge by a metal wedge or strip to allow the escape of gas and prevent the formation of bubbles and then fuse the parts together by the application of heat, after which the surfaces of the complete blank were ground and polished to the desired curvatures. In practising this method the metal supporting strip or wedge which was clamped to the blank was in contact with a considerable portion of the periphery of the relatively thick minor blank and the heat required to soften this part and allow the blank to fall into the cavity sometimes distorts the cavity and again the wedge sometimes forms a recess in the major lens which must be removed by excessive grinding.

I have found that the above objections can be effectively overcome and bifocal lens blanks produced with great economy by providing the minor lens blank with one or more small, integral projections at its edge or periphery preferably beyond the lenticular portion of the major lens by which it may be supported in position for fusion by a small supporting device, such as a piece of glass resting on the major lens blank if desired, and am therefore enabled to make the minor blanks of approximately the size of the recess in the major lens blank without waste of material, as will be hereinafter described.

Figure 3:
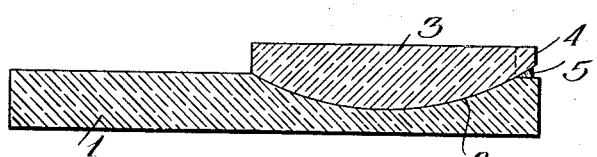

Fig. 3 a sectional view of the blank after being fused.

Figure 4:
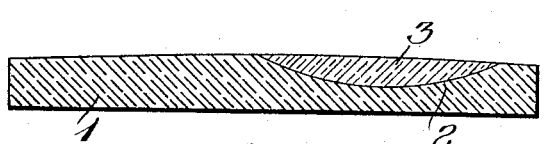

Fig. 4 a similar view of the complete blank partially ground.

Figure 5:
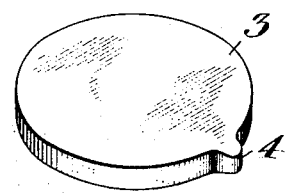

Fig. 5 a perspective view of the minor lens blank.

Figure 1:
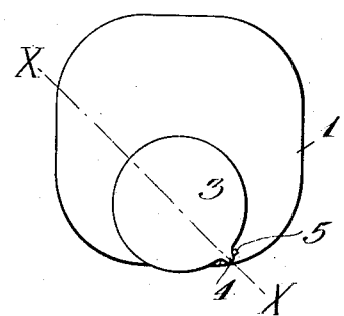
Figure 1 is a plan view of a bifocal lens blank ready to be fused.
Figure 6:
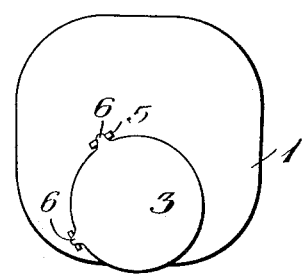
Figure 2:
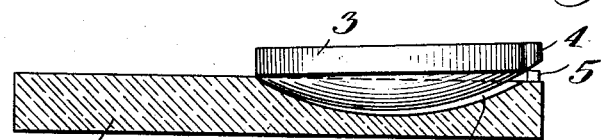
Fig. 2 is a sectional view thereof on the line X—X of Fig. 1, the minor lens blank being shown in elevation.

Fig. 6 is a view similar to Fig. 1, showing a minor blank with a plurality of projections.

Similar reference numerals throughout the several views indicate the same parts.

In forming bifocal lens blanks the major lens blank or section 1 is usually of crown glass having the ground and polished recess or lenticular portion 2 therein of the proper curvature. The minor lens blank 3 is of glass of higher or different refractive index, such as flint, with its lower surface ground and polished and of slightly greater curvature than that of the recess 2 and may be formed circular as shown with a relatively small integral lug or projection 4 extending outwardly beyond its periphery or boundary or at least beyond the lenticular surface by means of which it is supported slightly tilted in the position shown in Fig. 1 by a small piece of suitable material 5, such as glass, so that when two parts of the blank are subjected to the fusing heat the parts will assume the position shown in Fig. 3. As the supporting projection 4 is relatively small and is outside the lenticular portion or beyond the periphery of the blank 3 the latter can be readily made the full size required without waste of material and the grinding operation necessary to complete the lens blank in substantially the form shown in Fig. 4 may be performed without materially cutting below the edge of the minor lens.

The small supporting portion formed by the lug or projection will readily become softened when heat sufficient for fusion is attained thus yielding vertically and allowing the blank to sink into its recess without requiring the application of excessive heat liable to deform the ground and polished surface of the major lens.

The blank shown in Fig. 5 may be readily molded with the lug or projection thereon and one surface ground and polished as usual.

In Fig. 6, I have shown a modification of the minor lens blank provided with two small peripheral lugs 6—6 and it is obvious that one or more small projections extending beyond the lenticular portion of the blank could be otherwise provided.

Although the invention is shown as being embodied in a minor lens blank or circular contour it is nevertheless adapted for use with minor lens blanks of other shapes as is old in the art.

I claim as my invention:

1. A glass lens blank adapted to be fused to a complementary section having a lenticular portion, said blank having a relatively small integral projection extending beyond its periphery and beyond the periphery of the lenticular portion of the section and serving as a support during the fusing operation.

2. A lens blank adapted to form the minor lens of a fused bifocal lens, said blank being substantially circular in form and provided with an integral supporting lug or projection extending outwardly beyond its periphery.

3. In a method of manufacturing fused bifocal lens blanks in which the minor lens blank is positioned over and caused to soften and become fused in the cavity of the major lens blank in the application of heat, the improved step consisting in supporting the minor lens blank upon and at the edge of the cavity in the major lens upon an integral lug or projection extending outwardly from one side of and beyond the periphery of said minor lens blank.

4. A lens blank adapted to form the minor lens of a fused bifocal lens, said blank having a relatively small projection extending at the side thereof and beyond its boundary.

THEODORE B. DRESCHER.